United States Patent
Estrada et al.

(10) Patent No.: US 6,325,448 B1
(45) Date of Patent: Dec. 4, 2001

(54) ENHANCED AERODYNAMIC DEVICE FOR TRUCKS

(76) Inventors: Fred Estrada, 400 S. Flower, #42, Orange, CA (US) 92868; John A. Crone, 6072 Acacia Hill Dr., Yorba Linda, CA (US) 92886

( * ) Notice: Subject to any disclaimer, the term of this patent is extended or adjusted under 35 U.S.C. 154(b) by 0 days.

(21) Appl. No.: 09/540,116

(22) Filed: Mar. 31, 2000

(51) Int. Cl.⁷ .................. B62D 35/00; B60R 9/06
(52) U.S. Cl. ...................... 296/180.1; 296/37.6
(58) Field of Search ................ 296/37.1, 180.1, 296/180.2, 37.6, 180.5

(56) References Cited

U.S. PATENT DOCUMENTS

| | | | | |
|---|---|---|---|---|
| 4,159,843 | * | 7/1979 | Crossman | 296/180.1 |
| 4,215,896 | * | 8/1980 | Drouin | 296/37.6 |
| 4,451,075 | * | 5/1984 | Canfield | 296/180.1 |
| 4,506,870 | * | 3/1985 | Penn | 296/180.1 |
| 4,585,263 | * | 4/1986 | Hesner | 296/180.1 |
| 4,938,398 | * | 7/1990 | Hallsen | 296/37.6 |
| 4,941,702 | * | 7/1990 | Southward | 296/37.6 |
| 5,069,498 | * | 12/1991 | Benchoff | 296/180.1 |
| 5,083,829 | * | 1/1992 | Fonseca | 296/180.1 |
| 5,154,470 | * | 10/1992 | Bringman, Jr. | 296/180.1 |
| 5,232,259 | * | 8/1993 | Booker | 296/180.1 |
| 5,435,616 | * | 7/1995 | Corner | 296/37.6 |
| 5,498,049 | * | 3/1996 | Schlachter | 296/37.6 |
| 5,498,058 | * | 3/1996 | Kuo | 296/37.6 |
| 5,722,714 | * | 3/1998 | Vallerand | 296/180.1 |
| 5,735,567 | * | 4/1998 | Mora, Sr. | 296/180.1 |
| 5,743,589 | * | 4/1998 | Felker | 296/37.6 |
| 5,876,088 | * | 3/1999 | Spears | 296/180.5 |
| 5,924,616 | * | 7/1999 | Shives | 296/37.6 |
| 5,934,727 | * | 8/1999 | Storc et al. | 296/37.6 |
| 6,073,985 | * | 6/2000 | Keip | 296/37.6 |

* cited by examiner

*Primary Examiner*—Joseph D. Pape
*Assistant Examiner*—Hilary Gutman
(74) *Attorney, Agent, or Firm*—Oppenheimer Wolff & Donnelly LLP

(57) ABSTRACT

An aerodynamic device is disclosed which includes a generally triangular shaped device having a curved top surface which induces a laminar air flow over the tailgate of a truck. In addition, the aerodynamic device defines a space that may be used as a storage space. This space may be further defined by coupling the aerodynamic device to side panels and a floor panel to form a secure aerodynamic container. The container is aerodynamic in design and reduces the aerodynamic drag of a truck bed. Both the aerodynamic device and aerodynamic container disclosed significantly increase truck efficiency and reduce fuel consumption.

4 Claims, 4 Drawing Sheets

ENHANCED AERODYNAMIC DEVICE FOR TRUCKS

FIELD OF INVENTION

The present invention relates generally to aerodynamic devices that are placed in trucks. More particularly, the present invention relates to aerodynamic devices that promote laminar airflow over a truck's tailgate while providing a secure storage area. As a result of the laminar airflow created over the truck's tailgate, the truck's fuel efficiency is enhanced. Moreover, a convenient and easily accessed storage area is integrated within the aerodynamic device of the present invention.

BACKGROUND

Traditionally, primarily pickup trucks were used in construction and other work related activities. However, truck popularity, especially the new miniature pickup trucks, has increased dramatically in the last decade. These new light trucks are inexpensive to buy, versatile, practical and have become the vehicle of choice for many individuals for both work related and recreational activities.

However, in spite of the many positive attributes of pickup trucks, fuel inefficiency remains a major drawback. Pickup truck fuel inefficiency is inherently part of the design associated with high profile vehicles having various blunt surfaces and other features that are aerodynamically inefficient. One of the most aerodynamically impaired features is the truck bed, especially when the tailgate is closed in its upright position. In the upright position the tailgate creates a wall at the rear of the truck over which the air must travel when the vehicle is in motion. Air hitting the tailgate creates aerodynamic drag that results when moving air hits a blunt object, restricting its ability to flow smoothly around or over the object.

As an object moves through a fluid such as air or water, its forward progress is determined by the amount of thrust (pushing or pulling power) minus drag. Drag results when the fluid medium which the object is moving through strikes a surface (boundary front) on the object. The greater the drag, the more thrust that is required for an object to accelerate or maintain a set speed as it moves through the fluid medium. For example, as air pushes against a solid vertical surface (the boundary front), such as a tailgate, it strikes the boundary front at a right angle (90°). This in turn creates maximum drag as the air begins to swirl rapidly at the boundary front creating turbulent air. The turbulent air acts like miniature cyclones (vortexes) pulling more air into its center and holding the air against the boundary front, thus restricting its flow over the object. Consequently, the turbulent air must force its way over the boundary being impeded by the boundary itself and the turbulent air vortexes.

Aerodynamic drag can be reduced by eliminating the boundary front, reducing the angle of attack at the boundary front or increasing the rate at which air moves past the boundary. In many, if not most cases, the boundary front is a necessary or desirable part of the object and its elimination is not an option. Therefore, means of causing air to move more efficiently over the object must be considered first.

One means of increasing air flow over or around a boundary is to reduce the angle of attack between the moving air front and the boundary front. Reducing the angle of attack at the boundary front allows more air to freely pass over the boundary, reducing vortex generation and drag. However, merely reducing the angle of attack, while an improvement over a vertical surface, is an insufficient means of maximizing aerodynamic efficiency. Therefore, for minimum drag and maximum aerodynamic efficiency it is also necessary to promote or induce the smooth, laminar flow of air across the boundary's surface.

Laminar air flow results when air flows over a surface in a substantially parallel fashion. For example, imagine air rushing towards a boundary front as a series of parallel lines. As these parallel lines of air strike a boundary front they are deflected such that the parallel lines cross each other, forming vortexes. However, if a boundary could be created that would promote or induce the flow of air over its surface in substantially parallel lines, vortexes would be minimized and airflow would be substantially less impeded. This in turn would substantially decrease drag and increase performance efficiency of an object by reducing the energy required to generate thrust.

Various attempts have been made to alleviate the aerodynamic deficiencies of the truck bed. For instance, truck owners leave the tailgate open or remove the tailgate entirely. While leaving the tailgate open may alleviate drag associated with the tailgate in the closed position, the open tailgate may cause an increase in lift, creating vehicle instability at high speeds. Furthermore, if the tailgate is left open, its appearance may be marred by rocks and road debris. Additionally, smaller items cannot be stored in the truck bed since the items may either slide around the truck bed, which may damage the items, or they may fall out of the truck bed when the vehicle is in motion.

Mesh-type netting is another attempt to improve the aerodynamics of the truck bed. The mesh-type netting allows the air to flow through the rear of the truck partially alleviating aerodynamic drag. A drawback to the mesh-type netting is the tailgate must be removed from the truck and stored. Furthermore, smaller items may slide around in the truck bed and fall out when the vehicle is in motion through the open mesh netting. Moreover, smaller items cannot be securely stored and remain exposed to the elements. Additionally, the mesh-type netting may not be visually appealing to many truck owners.

In addition to the aerodynamic deficiencies in conventional truck bed design, there is a lack of storage space to hold smaller items such as groceries and work tools. Normally these items may be strewn about the bed when the truck is in motion. Furthermore, smaller items may be damaged while exposed to the elements such as rain, hail, sleet, or snow. Traditionally, a storage box is placed in the truck bed adjacent to the truck cab. Although the storage box placed behind the truck cab reduces storage problems, they are difficult to access, requiring the user to reach over the side of the truck, or climb into the truck bed to access to the storage box. Furthermore, traditional storage boxes do not alleviate the aerodynamic deficiencies of the truck bed and add considerable weight to the vehicle, further reducing fuel efficiency associated with conventional tailgate design.

One means of reducing drag and increasing truck utility has been the placing of a storage box adjacent to the tailgate. These storage boxes are triangularly-shaped, having a sharp linear incline from the top of the tailgate to the truck bed such that a right triangle is formed. Although it may seem that an inclined surface would reduce air resistance, the inventors of the present invention surprisingly found that the inclined surface still creates turbulent airflow as a result of the abrupt angle of impact between the moving air front and the boundary's linear surface. Consequently, aerodynamic resistance is only partially alleviated and fuel inefficiency remains high as previously described. Furthermore, this design reduces truck bed length significantly limiting the truck's overall utility for hauling oversized objects. Therefore, it would be a significant advance in truck design if an aerodynamic device were developed for pickup truck beds that significantly reduced aerodynamic drag at the tailgate and induced laminar air flow. Moreover, it would be an even greater advance if a laminar air inducing aerodynamic device for the pickup truck also increased the truck's utility by integrating within it a versatile storage space in addition to increasing overall fuel efficiency.

SUMMARY OF THE INVENTION

It is an object of the present invention is to provide an aerodynamic device for truck beds that minimizes turbulent airflow and encourages laminar airflow.

It is another object of the present invention is to provide an aerodynamic device that can also be adapted to store items of various shapes and sizes.

It is yet another object of the present invention to provide an aerodynamic device that promotes laminar air flow over the tailgate while providing a convenient and easily accessed storage area integrated within the present invention.

These and other features are achieved by the aerodynamic device of the present invention which, in accordance with a broad structural aspect of the invention, includes an aerodynamic device having a generally triangular shape with a curved top surface. This device directs and smoothly accelerates air, creating a laminar flow over the truck's tailgate. In addition, the aerodynamic device of the present invention defines a space that may be used for storage. This space may be further defined by coupling the aerodynamic device to the truck's side panels and floor panel to form a secure aerodynamic container. The present invention is aerodynamic in design and generates a smooth, laminar air flow over the rear of the truck bed, greatly reducing aerodynamic drag, resulting in greater fuel efficiency without sacrificing the truck's versatility and storage capacity.

Unlike the prior art aerodynamic containers, the aerodynamic container of the present invention also provides a means for utilizing the whole truck bed. In order to optimize storage flexibility, a pass-through opening at the leading edge of the aerodynamic container allows longer items to placed in the box and extend into the truck bed. This pass-through opening allows a truck owner to haul long items without removing the aerodynamic container. Thus, the truck's utility is not diminished, while improving fuel efficiency through reduced aerodynamic drag.

Other features and advantages of the present invention will become apparent from the following detailed description, taken in conjunction with the accompanying drawings which illustrate, by way of example, the principles of the present invention.

DETAILED DESCRIPTION

The aerodynamic device of the present invention is designed to promote laminar air flow over the tailgate of trucks. The inventors of the present invention surprisingly determined that by creating the curved surface of the aerodynamic device a laminar airflow is generated, thus significantly increasing a truck's fuel efficiency. Additionally, the aerodynamic device defines a storage space within by coupling the aerodynamic device of the present invention to side walls, floor panel, and tailgate of the truck bed.

Figure 1:
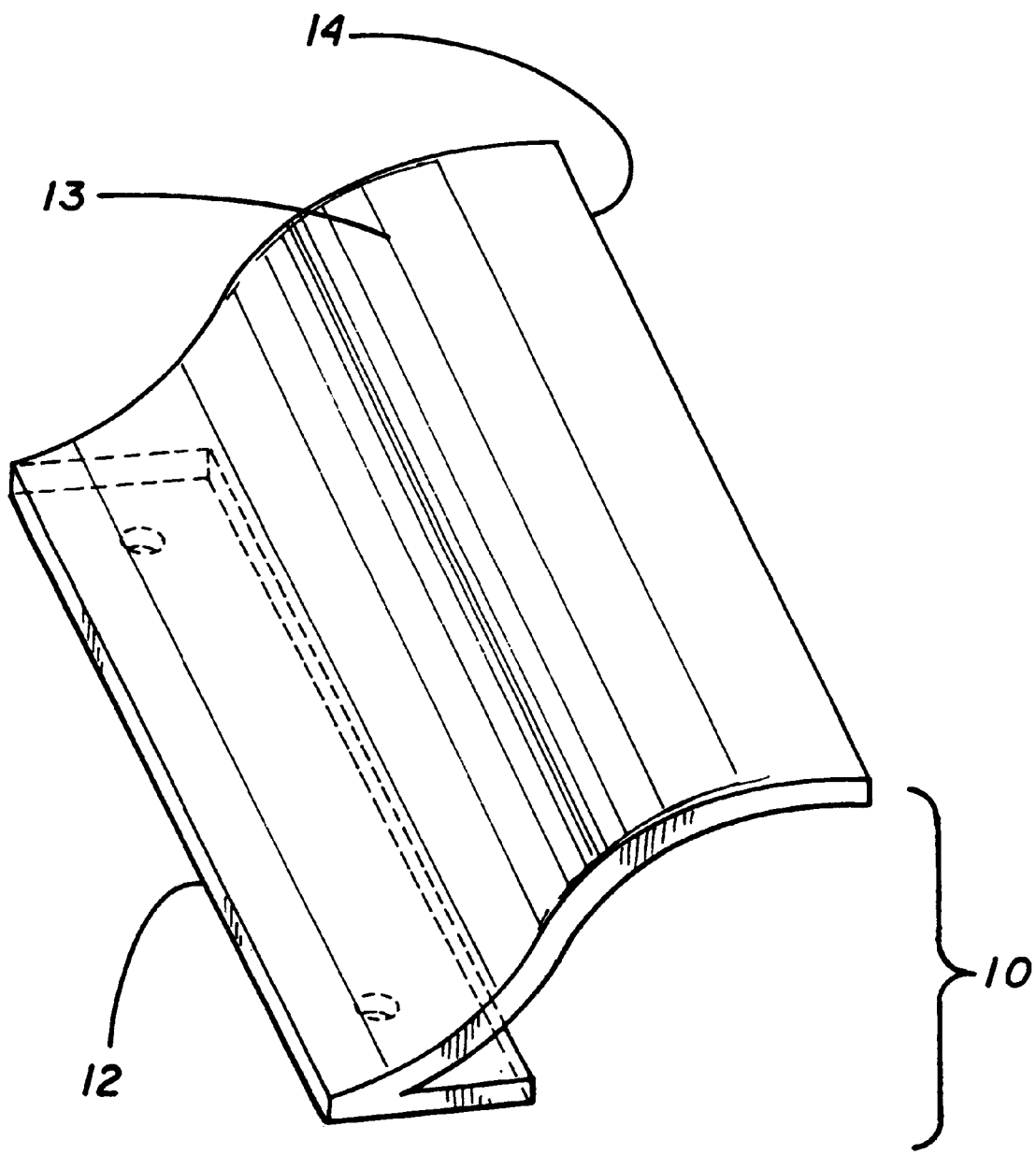
FIG. 1 is a perspective view of the aerodynamic device in accordance with the teaching of the present invention.

Referring more particularly to the drawings, FIG. 1 illustrates an aerodynamic device of the present invention having a generally triangular shape with a curved surface, indicated by reference 10. The aerodynamic device 10 has a leading edge 12, a trailing edge 14 and a top surface 13. The aerodynamic device can be made from materials such as metal, wood, plastic, or other materials that resist deformation. The aerodynamic device 10 may be coupled to the truck bed by means of bolts, screws, or other fastening devices known by those skilled in the art. When the aerodynamic device is installed in the truck bed, the trailing edge 14 of the aerodynamic device is positioned so that air flows smoothly over the tailgate of the truck in a laminar flow. Additionally, the trailing edge 14 is approximately the same height as the tailgate of the truck. The leading edge 12 is adjacent to the floor of the truck bed. The leading edge is 12 is lower in height as compared to the trailing edge 14 as shown in FIG. 1. In FIG. 1, the aerodynamic device 10 is approximately S-shaped. As such, the aerodynamic device 10 is exemplary only and is not intended to limit the present invention to that specific shape. The aerodynamic device may be shaped in other forms that would promote laminar airflow over the tailgate of a truck.

Additionally, a variety of innovations may be added to the present invention to further enhance the aerodynamic device 10. For example, vertical vanes may be added to the surface of the aerodynamic device that redirect air flow around the sides of the truck. Other innovations such as wings or airfoils may be added to the aerodynamic device to achieve different aerodynamic properties and reduce drag. It is contemplated that these and other innovations may be added to the aerodynamic device of the present invention.

As those skilled in the art will appreciate, the overall dimensions of the aerodynamic device 10 are determined by dimensions of the truck bed. As such, the aerodynamic device 10 shown in FIG. 1 is exemplary only and is not intended to limit the present invention to specific relative dimensions. However, it is anticipated as being within the scope of the present invention to produce a aerodynamic device ranging in length from approximately 51 cm (20 inches) to 61 cm (24 inches), height ranging from approximately 38 cm (15 inches) to 48 cm (19 inches), depth ranging from 53 cm (21 inches) to 78 cm (31 inches), and width ranging from approximately 121 cm (48 inches) to 152 cm (60 inches). Though these dimensions are exemplary only, larger or smaller size aerodynamic devices are within the scope of the present invention and it is believed that these exemplary dimensions are suitable for most currently know truck beds that would utilize aerodynamic containers as such as those of the present invention.

In an alternate embodiment, the aerodynamic device 10 may be provided with a pass-through opening located near the leading edge 12. The pass-through opening allows long objects to pass through the aerodynamic device 10 and extend into the truck bed. The pass-through opening may be covered with a pass-through door. The pass-through door may be pivotally coupled to the aerodynamic device by means of a hinge, a piano-type hinge, injection molded hinge, or by other pivoting means known by those skilled in the art.

Figure 2:
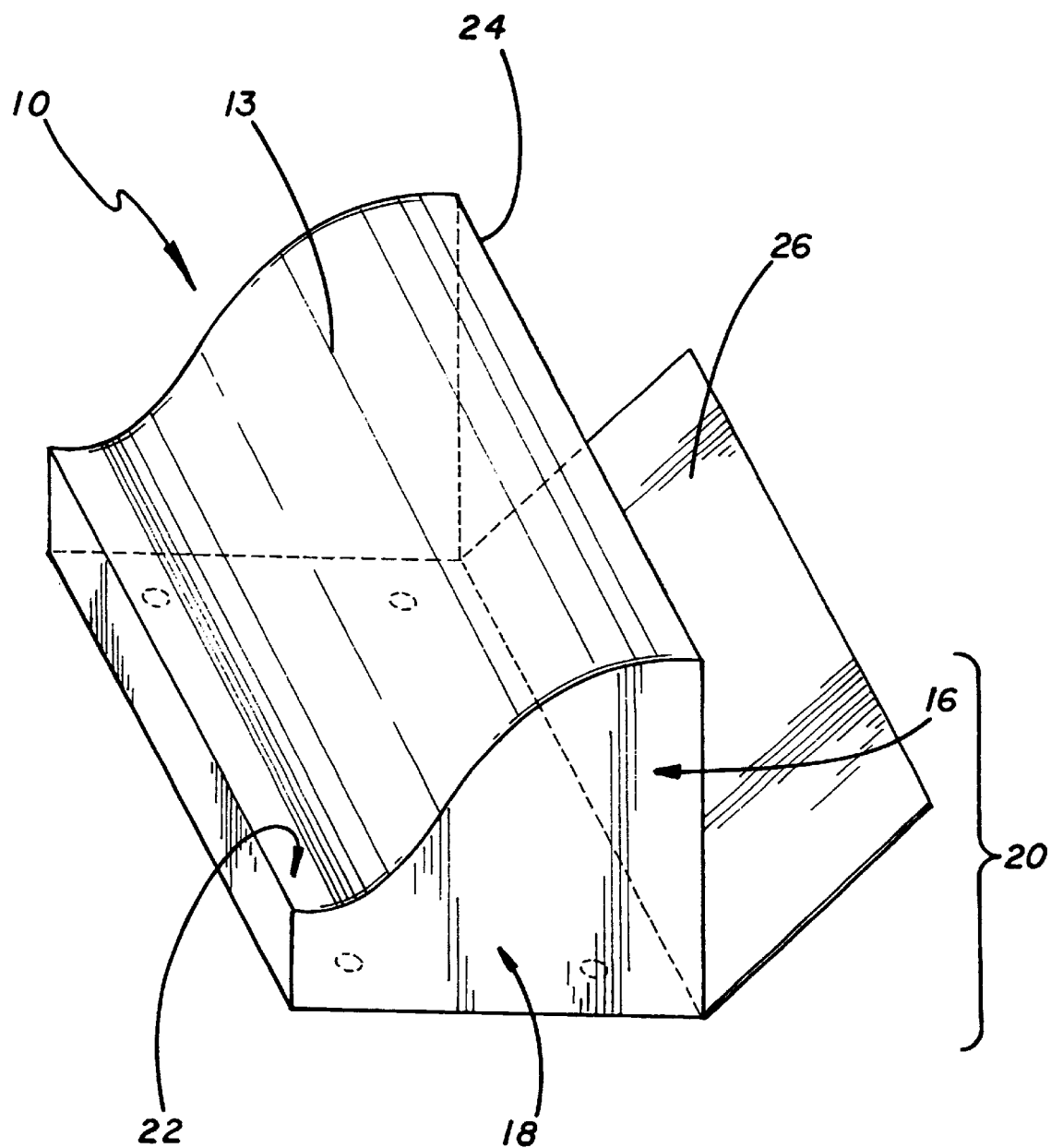
FIG. 2 is a perspective view of the aerodynamic container in accordance with teaching of the present invention.

FIG. 2 illustrates another embodiment of the present invention. The aerodynamic device 10 is coupled to side panels 16 and a floor panel 18 to form an aerodynamic device having a storage area (aerodynamic container) 20. Referring more particularly to the drawings, FIG. 2 illustrates an embodiment of the aerodynamic container 20 of the present invention. The aerodynamic container 20 may be formed from plywood, metal, plastic, or other like materials that will resist deformation. The aerodynamic container 20 has a leading edge 22 and a trailing edge 24, wherein the trailing edge 24 is taller in height as compared to the leading edge 22 of the aerodynamic container. The aerodynamic container 20 is placed in a position at the rear of the truck bed so that the trailing edge 24 of the aerodynamic container is substantially adjacent to the tailgate.

As those skilled in the art will appreciate, the overall dimensions of the aerodynamic container 20 are determined by dimensions of the truck bed that the aerodynamic container will be installed in. As such, the aerodynamic container shown in FIG. 2 is exemplary only and is not intended to limit the present invention to specific relative dimensions. However, it is anticipated as being within the scope of the present invention to produce a aerodynamic container ranging in length from approximately 51 cm (20 inches) to 61 cm (24 inches), height ranging from approximately 38 cm (15 inches) to 48 cm (19 inches), depth ranging from 53 cm (21 inches) to 78 cm (31 inches), and width ranging from approximately 121 cm (48 inches) to 152 cm (60 inches). Though these dimensions are exemplary only, larger or smaller size aerodynamic containers are within the scope of the present invention and it is believed that these exemplary dimensions are suitable for most currently know truck beds that would utilize aerodynamic containers as such as those of the present invention.

The aerodynamic container 20 can be secured within the truck bed by providing holes in the floor panel 18 of the aerodynamic container. The aerodynamic container 20 is then coupled to the floor of the truck bed by means of bolts, screws, or by other fastening means known by those skilled in the art. Alternatively, the side panels 16 may be provided with holes that would allow the aerodynamic container 20 to be secured within the truck bed by strapping, tying or latching the aerodynamic container 20 to the side walls of the truck bed. As those skilled in the art will appreciate, various combinations of the aforementioned securing means may by used to secure the aerodynamic container within the truck bed.

As shown in FIG. 2, the aerodynamic container 20 is provided with a aerodynamic device 10. The aerodynamic device 10 has a leading edge 12, a trailing edge 14 and a top surface 13. When the aerodynamic container 20 is installed in the truck bed, the trailing edge 14 of the aerodynamic device is substantially adjacent to the tailgate of the truck. Additionally, the trailing edge 14 is approximately the same height as a closed tailgate. The trailing edge 14 of the aerodynamic device is lower in height as compared to the leading edge 12 as shown in FIG. 2. In FIG. 2, the aerodynamic device 10 is approximately S-shaped. As such, aerodynamic device 10 shown in FIG. 2 is exemplary only and is not intended to limit the present invention to that specific shape. The aerodynamic device 10 may be shaped in other forms that would promote air to accelerate to laminar airflow over the tailgate of the truck. The aerodynamic device 10 is coupled to side panels 16. The side panels 16 may be welded, tacked, glued to the aerodynamic device 10. The aerodynamic container 20 comprising the side panels 16 and the floor panel 18 may be composite molded to form an unitary piece. A door 26 for the aerodynamic container 20 may be pivotally coupled to the floor panel 18. The door 26 may be attached to the floor panel 18 by means of a hinge, a piano hinge, injected molded hinge, and by other pivoting mechanisms. When the door 26 is closed, the door 26 may be recessed within the aerodynamic container or flush with the outer edges of the storage bin. Alternatively, the opening of the storage bin may be secured by closing the tailgate of the truck.

When the door 26 is closed in the upright position, it may be locked. In one embodiment, at least one lock is placed along the top edge of the door panel 26 and the accompanying latch is positioned on the trailing edge 14 of the aerodynamic device. Alternatively, a single lock may be used that would be centered on the top edge of the door panel 26 and the accompanying latch would be centered on the trailing edge 14 of the aerodynamic device. In another embodiment, the door may be locked by means of a recessed finger grip handle with two rods affixed to the inner part of the grip handle. The rods are secured to the handle with C-clips and pins. The rods extend in opposite directions and span across the door panel 26. The rods are held in a horizontal position by brackets that are mounted on the inside of the door panel 26. When the recessed finger grip handle is twisted, the rods slide horizontally and engage the inside portion of the side panels. As those skilled in the prior art will appreciate, various combinations of the aforementioned locking mechanisms may be employed to secure the aerodynamic container 20.

Figure 3:
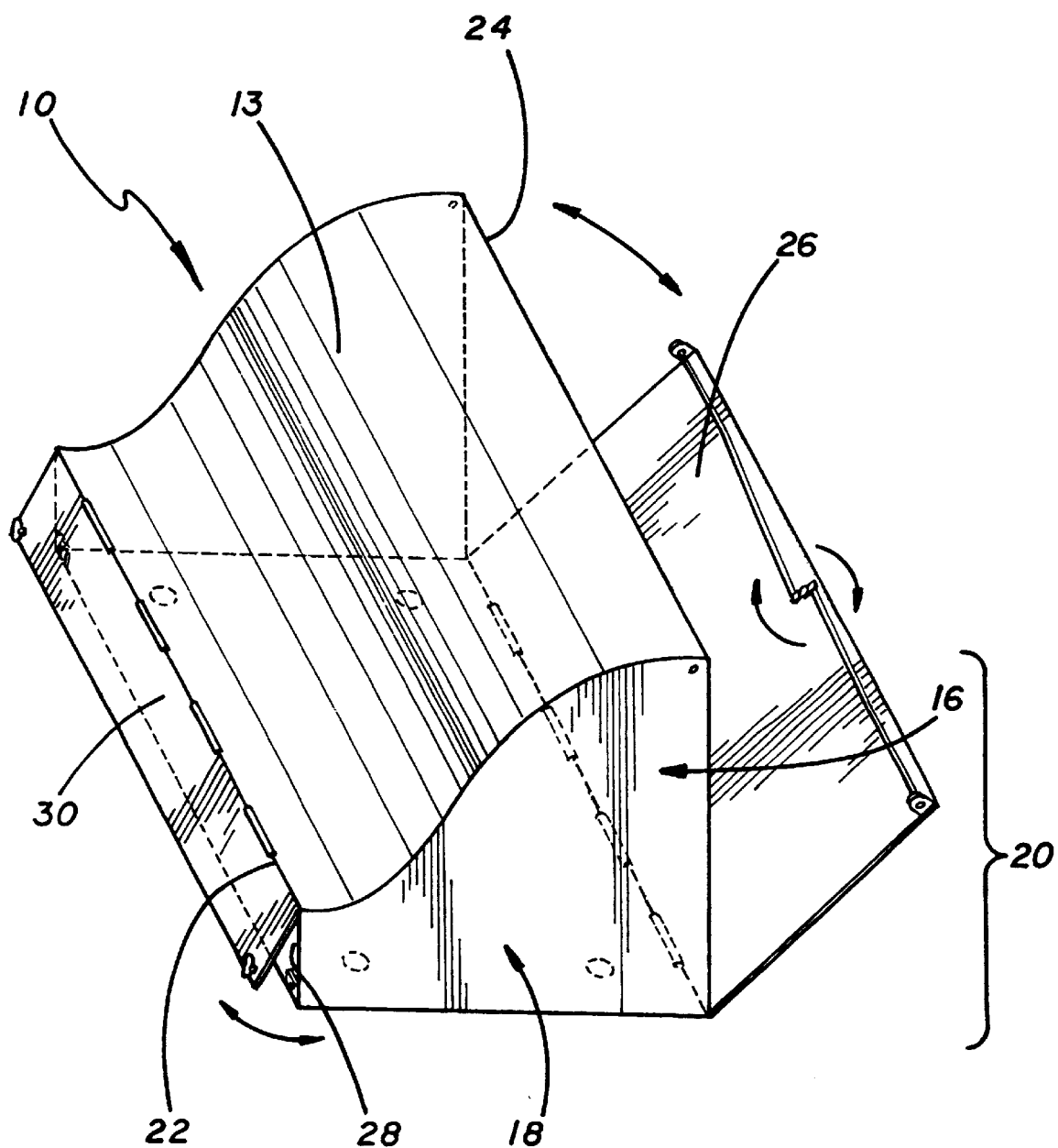
FIG. 3 is a perspective view of an alternate embodiment of the aerodynamic container in accordance with the teaching of the present invention.

FIG. 3 illustrates another embodiment of the present invention. This embodiment further incorporates a pass-through opening, generally indicated by reference 28. The pass-through opening 28 is located at the leading edge 22 of the aerodynamic container. The pass-through opening 28 may be exposed or covered by means of a pass-through door 30. When the pass-through door 30 is opened, the pass-through opening 28 is exposed which allows longer items to be placed in the aerodynamic container and extend into the truck bed. As shown in FIG. 3, the pass-through door 30 is pivotally coupled to the leading edge of the aerodynamic device 10 by means of a hinge, a piano-type hinge, injected molded hinge, and by other pivoting mechanisms known by those skilled in the art. The coupling of the pass-through door 30 to the leading edge of the aerodynamic device, as shown in FIG. 2, is exemplary only and is not intended to limit the present invention. For example, the pass-through door 30 may be attached to the floor panel 18 by means of a hinge, a piano-type hinge, injected molded hinge, and by other pivoting mechanisms known by those skilled in the art.

Figure 4:
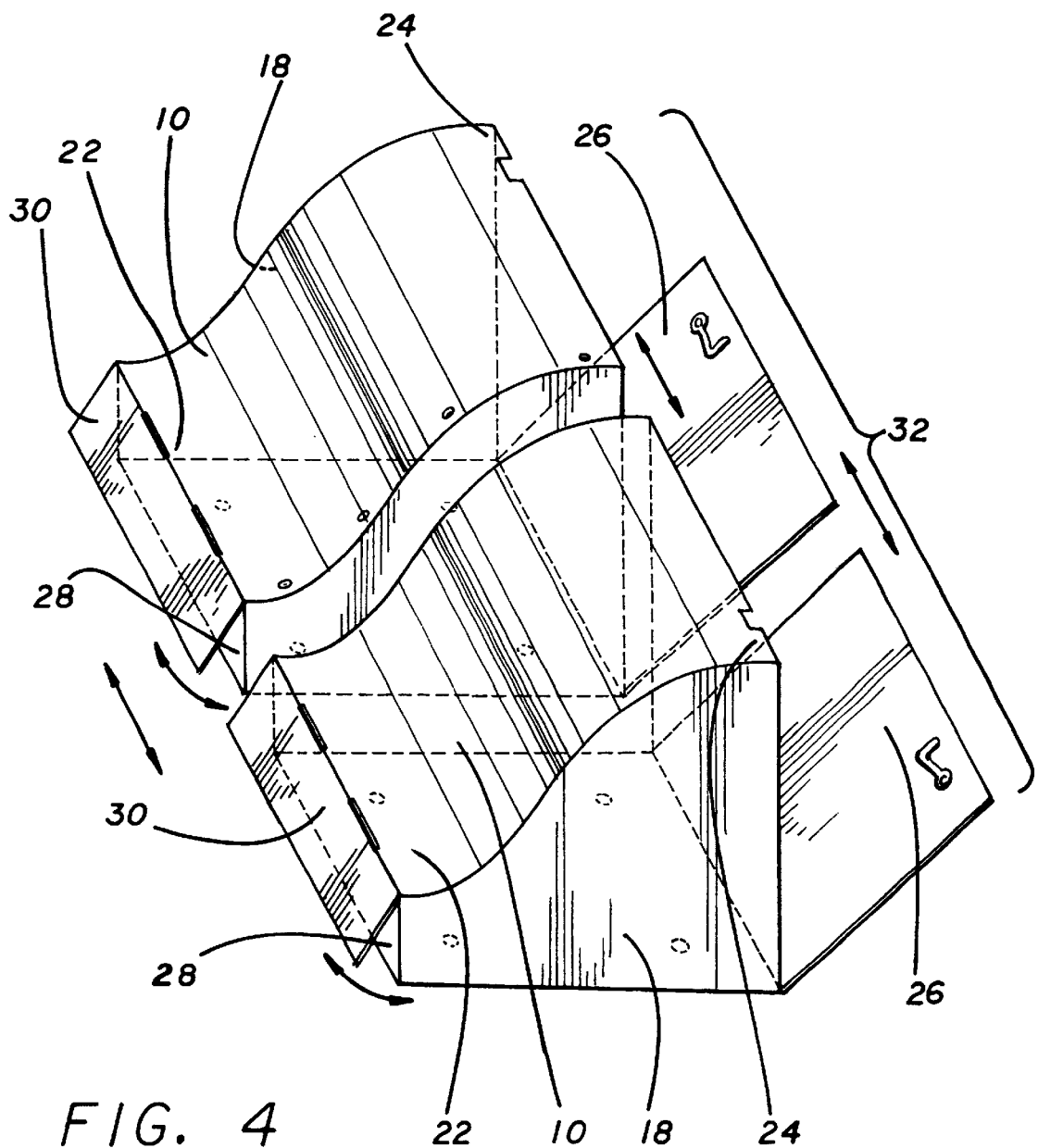
FIG. 4 is a perspective view of yet another embodiment of the aerodynamic container in accordance with the teaching of the present invention.

FIG. 4 shows another embodiment of the present invention. FIG. 4 illustrates an universal aerodynamic container 32. The universal aerodynamic container may be either expanded or contracted to fit different sized truck beds. The universal aerodynamic container 32 is an amalgamation of two aerodynamic containers that can slide relative to each other so that the overall width of the universal aerodynamic container 32 is variable. Each half of the universal aerodynamic container 32 consists of a aerodynamic device 10, a side panel 16, a floor panel 18, and a door panel 26. The aerodynamic device 10 is coupled to a side panel 16, and the side panel is coupled to the floor panel 18. The door 26 is pivotally coupled to the floor panel 18. One half of the universal aerodynamic container is slightly smaller than the other half of aerodynamic container that allows the small half to slide inside the bigger half. The two halves combined form an universal aerodynamic container 32. The halves are moveable relative to one another to adjust for the width of the truck bed.

The universal aerodynamic container 32 may be installed within a truck bed by providing the side walls with holes and then strapping, tying, or latching the side panels 16 of the container to the side walls of the truck bed or to utility hooks attached to the truck bed.

The door 26 or each half of the universal aerodynamic container may be locked. Each door 26 may have a lock placed along the top edge and an accompanying latch may be positioned along the trailing edge of the aerodynamic device. Alternatively, the lock may be placed on the trailing edge of the aerodynamic device and the accompanying latch may be positioned on the door. It is contemplated that various locking mechanisms may be used to lock the universal aerodynamic container.

In another embodiment of the universal aerodynamic container 32, the container 32 may have a pass-through opening 28. The pass-through opening 28 is located at the leading edge of the universal aerodynamic container. The pass-through opening may be exposed or covered by means of pass-through doors 30. When the pass-through doors 30 are opened, it exposes the pass-through opening 28 which allows longer items to be placed in the aerodynamic container and extend into the truck bed. As shown in FIG. 4, the pass-through doors 30 are pivotally coupled to the leading edge of the aerodynamic device by means of a hinge, a piano-type hinge, injected molded hinge, and by other pivoting mechanisms known by those skilled in the art. The coupling of the pass-through doors to the leading edges of the laminar flow surface, as shown in FIG. 4, is exemplary only and is not intended to limit the present invention. For example, the pass-through doors 30 may be attached to the floor panel by means of a hinge, a piano-type hinge, injected molded hinge, and by other pivoting mechanisms known by those skilled in the art.

It is to be understood that the embodiments of the invention disclosed herein are illustrative of the principles of the invention. Other modification may be employed which are within the scope of the invention; thus, by way of example but not of limitation, alternative configurations of the aerodynamic device may be utilized to cause air to smoothly accelerate to laminar flow. Additionally, alternative configurations of the aerodynamic device may be used to form an aerodynamic container. Accordingly, the present invention is not limited to that precisely as shown and described in the present specification.

What is claimed is:

1. An aerodynamic device for a truck bed comprising:
    a generally triangular-shaped device having a S-shaped surface, wherein said S-shaped surface includes leading edge, a trailing edge, and a top surface;
    said aerodynamic device attached to said truck bed, substantially adjacent to a tailgate of a truck;
    said aerodynamic device extends across the width of said truck bed;
    a pass-through opening substantially adjacent to said leading edge of said aerodynamic device, said pass-through opening extending substantially across the width of said leading edge, wherein said pass-through opening is adapted to allow longer items to be placed through said aerodynamic device;
    a pass-through door that is pivotally coupled to said aerodynamic device, said pass-through door having a first position and a second position, wherein in said first position said pass-through door covers said pass-through opening and in said second position said pass-through door exposes said pass-through opening; and
    said top surface of said S-shaped surface being curved to promote and induce laminar airflow over said top surface.

2. An aerodynamic container comprising:
    a generally triangular-shaped device having a S-shaped surface, wherein said S-shaped surface includes leading edge, a trailing edge, and a top surface;
    at least one side panel coupled to said S-shaped surface;
    a floor panel coupled to said at least one side panel;
    a door panel pivotally coupled to said floor panel;
    a pass-through opening substantially adjacent to said leading edge of said aerodynamic device, said pass-through opening extending substantially across the width of said leading edge of said aerodynamic device, wherein said pass-through opening is adapted to allow longer items to be placed through said aerodynamic device;
    a pass-through door that is pivotally coupled to said leading edge of said aerodynamic device said pass-through door having a first position and a second position, wherein in said first position said pass-through door covers said pass-through opening and in said second position said pass-through door exposes said pass-through opening; and
    said top surface of said S-shaped surface being curved to promote and induce laminar airflow over said top surface.

3. An aerodynamic container comprising:
    a first aerodynamic device and a second aerodynamic device, wherein said first aerodynamic device overlaps said second aerodynamic device, and said second aerodynamic device may be extended away from said first aerodynamic device;
    said first aerodynamic device and said second aerodynamic device having a S-shaped surface, said S-shaped surface further having a leading edge and a trailing edge;
    a first side panel coupled to said first aerodynamic device, and a second side panel coupled to said second aerodynamic device;
    a first floor panel coupled to said first side panel, and a second floor panel coupled to said second side panel;
    a first door panel pivotally coupled to said first floor panel, and a second door panel coupled to said second floor panel;
    a variable width pass-through opening, wherein said variable width pass-through opening is a combination of a first pass-through opening and a second pass-through opening;
        said first pass-through opening substantially adjacent to said leading edge of said first aerodynamic device, and said first pass-through opening extending across said width of said first aerodynamic device;
        said second pass-through opening substantially adjacent to said leading edge of said second aerodynamic device, and said second pass-through opening extending across said width of said second aerodynamic device;
    a first pass-through door that is pivotally coupled to the leading edge of said first aerodynamic device, and a second pass-through door that is pivotally coupled to the leading edge of said second aerodynamic device; and
    said first aerodynamic device and said second aerodynamic device being curved to promote laminar airflow over a truck tailgate.

4. The aerodynamic container of claim 3 wherein said aerodynamic container is attached to a truck bed, substantially adjacent to a truck tailgate.

* * * * *